United States Patent [19]
Jepson

[11] B 3,914,373
[45] Oct. 21, 1975

[54] METHOD FOR SEPARATING ISOTOPES
[75] Inventor: Bernhart E. Jepson, Dayton, Ohio
[73] Assignee: The United States of America as represented by the United States Energy Research and Development Administration, Washington, D.C.
[22] Filed: Jan. 20, 1973
[21] Appl. No.: 322,564
[44] Published under the Trial Voluntary Protest Program on January 28, 1975 as document no. B 322,564.

[52] U.S. Cl. ............... 423/2; 260/429; 260/429.2; 260/429.5; 260/429.9; 260/430; 260/431; 260/435; 260/439; 423/21; 423/23; 423/69; 423/99; 423/138; 423/155; 423/179
[51] Int. Cl.² .......................................... C01G 57/00
[58] Field of Search ............ 423/2, 8, 155, 249, 21, 423/23, 69, 99, 138, 179

[56] References Cited
OTHER PUBLICATIONS
Pedersen, J. Amer. Chem. Soc., Vol. 92, pp. 391 to 394, (1970).

*Primary Examiner*—Leland A. Sebastian
*Attorney, Agent, or Firm*—John A. Horan; Dudley W. King; Ignacio Resendez

[57] ABSTRACT
Isotopes are separated by contacting a feed solution containing the isotopes with a cyclic polyether wherein a complex of one isotope is formed with the cyclic polyether, the cyclic polyether complex is extracted from the feed solution, and the isotope is thereafter separated from the cyclic polyether.

6 Claims, 1 Drawing Figure

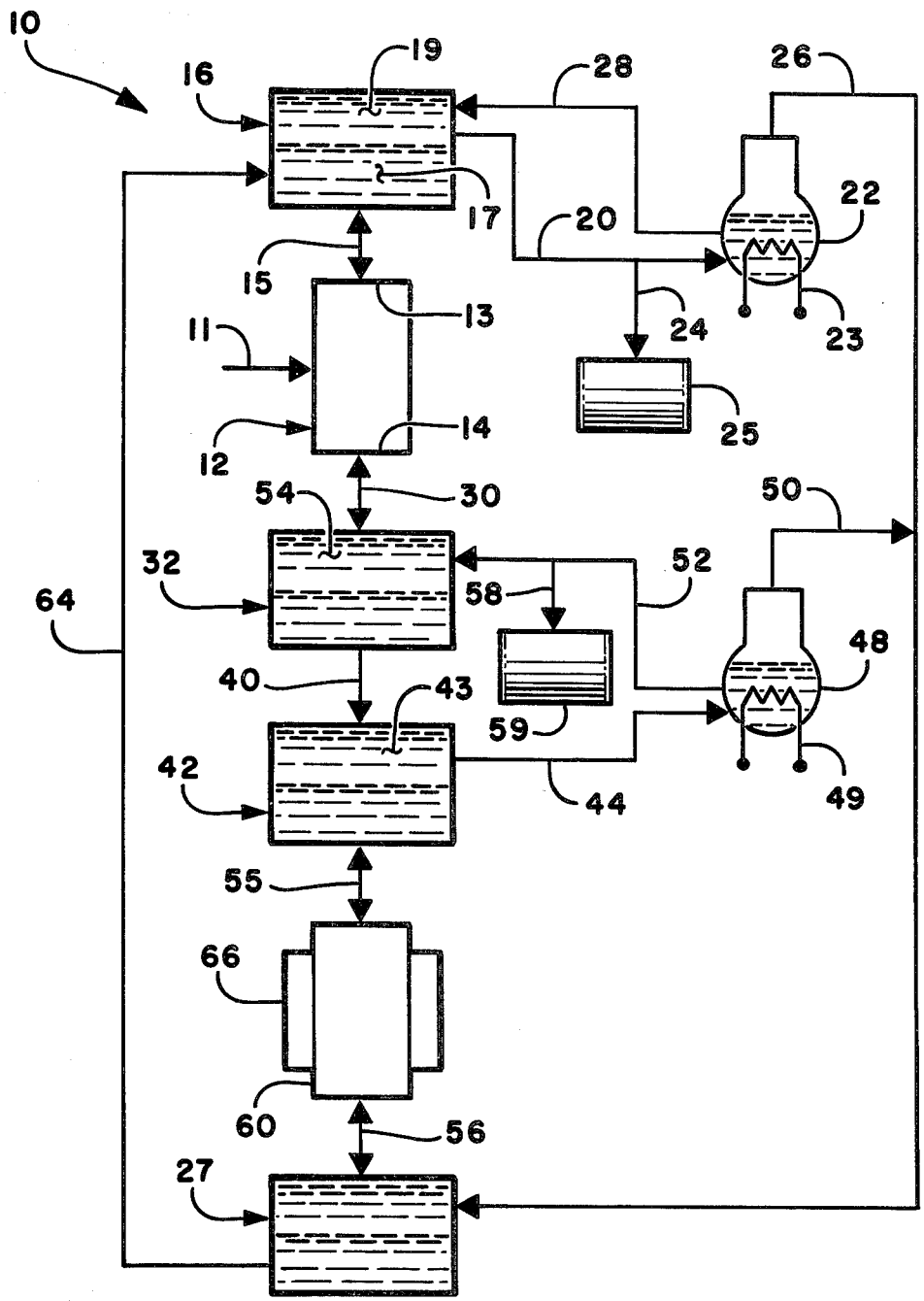

METHOD FOR SEPARATING ISOTOPES

BACKGROUND OF THE INVENTION

The invention is concerned with the separation of isotopes, including radioisotopes, using chemical exchange processes. Various processes are known for the purpose of concentrating isotopes of specific light elements such as boron. Chemical exchange processes are often less expensive and simpler than other isotope enrichment processes. The importance of being able to separate isotopes of a specific element by chemical methods is typified by the rising demand and importance of calcium isotopes in clinical, biological and medical research.

The formation of metal salt complexes of macrocyclic polyethers has been reported by C. J. Pedersen in "Cyclic Polyethers and Their Complexes with Metal Salts" found in the *Journal of the American Chemical Society*, Volume 89:26, December 20, 1967, p. 7017, and also in "Crystalline Salt Complexes of Macrocyclic Polyethers" in the *Journal of the American Chemical Society*, Volume 92:2, Jan. 28, 1970, p. 386, also by Pedersen.

SUMMARY OF THE INVENTION

It is an object of this invention to provide a method for separating isotopes, including radioisotopes, of an element.

It is an object of this invention to provide isotope separation by the preferential formation of a complex of one isotope with a cyclic polyether and subsequent separation of the cyclic polyether containing the complexed isotope from the feed solution.

It is an object of this invention to provide a process for separating isotopes of an element using chemical reactions, which process is applicable to a large number of elements using a variety of cyclic polyethers as extracting agents.

Various other objects and advantages will become apparent from the following description of this invention and the most novel features will be pointed out with particularity hereinafter in connection with the appended claims. It is understood that various changes in the details, solutions, materials, and process steps which are herein described and illustrated to better explain the nature of the invention may be made by those skilled in the art without departing from the scope of the invention.

The invention comprises, in brief, contacting a feed solution containing isotopes of an element with a cyclic polyether to form a complex therewith of one isotope. It has been discovered that the cyclic polyether will have an affinity for one of the isotopes such that retention of other isotopes by the feed solution and extraction of the one isotope into the cyclic polyether complex is effected. The cyclic polyether complex is then contacted with an extracting solution to extract the isotope from the cyclic polyether into the extracting solution and thereafter recovered therefrom. This invention enables a chemical separation of isotope mixtures in which a constant refluxing system permits a continuous counter-current liquid-liquid extraction as opposed to inefficient batch operations.

DESCRIPTION OF DRAWING

The drawing is a diagrammatic representation of an embodiment of apparatus and process suitable for implementing this invention.

DETAILED DESCRIPTION

A feed solution containing isotopes to be separated is fed through a suitable conduit represented by arrow 11 into a multi-stage exchange column 12. The isotopes in the feed solution may include radioisotopes. The feed solution used may be any type of suitable material which contains the isotopes in solution, wherein the isotopes are as will be described hereinafter, but preferably is simply an aqueous solution. An aqueous solution mixture with alcohol, to be hereinafter referred to as aqueous solution, may be used advantageously in certain circumstances with different metals and may have operating advantages because of lower density and viscosity of the aqueous phase. Alcohols which may be used are such as ethanol, methanol, butanol, propanol, iso-propyl, and mixtures thereof etc. A typical limitation to the type of alcohol which may be used is the requirement that the alcohol be soluble both in aqueous and organic phases.

Entering or being fed into exchange column 12 at an upper location 13 is a suitable cyclic polyether solution which may be in the pure form or in a suitable solvent. A suitable macrocyclic polyether as used herein is defined as one which forms a complex with the metal salts whose isotopes are to be separated. Examples of cyclic polyethers which may be used are given in Table I and will be discussed hereinafter. The terms "macrocyclic polyether" and "cyclic polyether" are used interchangeably herein and refer to those polyethers listed in the table and other similar polyethers. The direction of input of the feed solution through suitable conduit as shown by arrow 11 and the cyclic polyether entering at the upper part 13 of the exchange column 12 creates, in effect, a counter-current multi-stage liquid-liquid exchange column 12. This counter-current effect is further accentuated by the solution entering at lower portion 14 of column 12 as will be described hereinafter.

Although the exchange column is shown in one block, it may incorporate therein a series of stages to maximize contact between feed solution and cyclic polyether solution. The heavy isotopes of the metal tend to remain in the aqueous feed solution or phase, moving up the column in the direction of the top portion 13. Applicant has discovered that cyclic polyethers have a greater affinity for one of the isotopes, the lighter isotope, such that the cyclic polyether forms a metal complex in the exchange column 12 with the lighter isotopes of the metal and thereby effects preferential extraction of the lighter isotope from the feed solution.

The flow of a separate aqueous solution is in an upward direction entering at the bottom portion 14 by means of conduit 30 and exiting at the top portion 13 of the exchange column 12. As in the feed solution, this separate aqueous solution may preferably be 100 percent water but may also be an about 20 percent to 100 percent water and 0 percent to about 80 percent alcohol mixture wherein the alcohol is a suitable alcohol such as methanol, ethanol, propanol, butanol, etc., as recited hereinabove in the treatment of suitable alcohol for the feed solution. Consequently the motion of the heavy isotopes is in an upward direction since they tend to remain within the aqueous solution. The motion of the complexed isotope, in the form of a complex with the cyclic polyether, will be in a downward direction towards the bottom portion 14 of exchange column 12. The net result is that the bottom portion 14 solution is depleted in the heavy isotope concentration whereas the top portion 13 has an enrichment of the heavy isotope concentration.

Appropriate conduit 15 removes the aqueous feed solution containing the heavy isotopes into a phase separator 16 which may contain high concentration of fresh organic cyclic polyether solution in the bottom portion or layer 17 of the phase separator 16 such as to be introduced also through appropriate conduit 15 into exchange column 12. The upper layer 19 or the solution floating upon the organic polyether in phase separator 16 is the aqueous solution containing the heavy isotope.

Although the system described here is illustrative of one wherein the organic phase (polyether and solvent) is heavier than the aqueous salt feed solution such as when chloroform is used as the solvent, the same system is operable in those cases wherein the organic phase is lighter than the aqueous salt feed solution, i.e., such as when methylene chloride is used as the solvent. In the latter situation, it is to be understood that references to a phase being in a lower or upper portion of a phase separator are to be interpreted in light of the relative densities of the solutions being used.

An appropriate conduit 20 may be used to remove into suitable distillation means 22 some of the aqueous solution containing the heavy isotope which may have been carried over by the aqueous solution. The solution in distillation means 22 may be heated with an internal heater 23 or by any other appropriate electric or other heater. As shown by conduit 24, a portion of the aqueous solution from conduit 20 may be removed or withdrawn and recovered in suitable container 25 through suitable valving means (not shown) as a product enriched in heavy isotopes. The solution being distilled by means of distillation column 22 is carried over by suitable conduit 26 into a subsequent phase separator 27 where it will be used to perform a separate function as described hereinafter. Suitable conduit 28 is used to carry off into the phase separator 16 a portion of the water remaining in the distillation column 22 where that water contains some of the isotopes which were carried over through the exchange column from the feed solution. An equation which is typical for the isotopic enrichment of various elements and which is representative of the reaction in the exchange column 12 when using a feed solution containing calcium is:

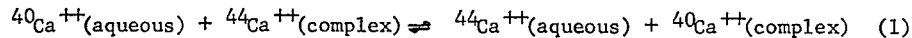

A more representative equation of the reaction taking place in column 12 is:

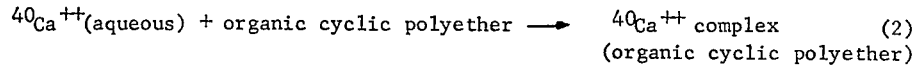

The cyclic polyether containing the separated or complexed isotopes may be removed from column 12 by means of such as conduit 30 at the bottom portion 14 of column 12 into phase separator 32 and thereafter by means of conduit 40 into a subsequent phase separator 42. The aqueous layer 43 in phase separator 42 is drawn off through conduit 44 into appropriate distillation column 48. This layer of solution contains a dilute isotope, light isotope, concentration. The solution in distillation column 48 may be heated with an internal heater 49, or by any other appropriate electric or other heater. Distillation in distillation column 48 effects removal of water by means of conduit 50 interconnecting with conduit 26, which water is then transported into phase separator 27. A portion of the solution drawn off from phase separator 42 and distilled in distillation column 48 is then removed from distillation column 48 by means of conduit 52 into the aqueous portion 54 of phase separator 32. This solution has a high concentration of the light isotope and a substantial portion of it may be removed from conduit 52 prior to entering phase separator 32 as shown by conduit 58 and recovered in suitable container 59 and subsequently disposed of, or, depending upon the type of isotope and the need for said isotope, it may be recovered using other recovery procedures for further processing and use if desired.

The function of phase separators 32 and 42 is to intermix a fresh solution of water or other suitable water-alcohol mixture as an extracting solution with the cyclic polyether. The quantity of water or water-alcohol mixture introduced as extracting solution is substantially greater than that introduced at column 12 such that the complex contained in the cyclic polyether is then extracted from the cyclic polyether into the aqueous solution. Thus, the net result of that interchange is that the light isotope is contained in the aqueous solution enabling separation by means of distillation column 48. In effect, the organic phase from the exchange column passes down through two phase separators 32, 42 into a counter-current liquid-liquid extraction column 60 by means of conduits 40, 55. In extraction column 60, it is counter currently contacted with a water solution. The extraction column may be maintained at elevated temperatures such as between about 25°C and about 60°C to enhance the extraction by suitable heating means such as a steam or electric type heater 66. The metal ions, i.e., the light isotopes, are quantitatively extracted from the cyclic polyether and are carried upward into phase separator 42 through suitable conduit means 55. The organic solvent, if one is used to bring the cyclic polyether into solution, and the now pure cyclic polyether are transferred by means of suitable conduit 56 into phase separator 27. They are then separated from the water phase in the bottom phase separator 27 and recycled back to the top portion of this system, i.e., phase separator 16, by means of appropriate conduit 64. The aqueous solution or aqueous alcohol mixture passing up the extraction column 60 is maintained with a dilute solvated metal concentration, i.e., a light isotope concentration, by passing an excess of water into the bottom phase separator 27. This excess of water is derived from distillation columns 22 and 48 as the distillate.

It is to be understood that there may be a plurality of conduits used in those areas where upward and downward flow conduits 15, 30, 55, 56 are shown in order to facilitate fluid transfer.

An equation which is representative of the reaction occurring in extraction column 60 is such as:

$$Ca^{++}(\text{complex}) \xrightarrow[\Delta]{H_2O} Ca^{++}(\text{aqueous}) + \text{polyether (very dilute)} \quad (3)$$

The macrocyclic polyethers or, simply, polyethers, herein referred to may be selected from Table I. As discussed hereinabove, the cyclic polyether that is to be used may be put into solution by the use of a suitable solvent. Solvents which have been successfully used are trichloromethane, commonly referred to as chloroform ($CHCl_3$), and methylene chloride ($CH_2Cl_2$). Other solvents that may be used are such as halogenated hydrocarbons generally and also benzene, tetrahydrofuran, toluene, nitromethane, etc. Generally, a suitable solvent is one which is immiscible with aqueous-salt solutions and in which metal complexes of the polyether are soluble. Solvents in which the uncomplexed metal salts are soluble are undesirable. The metal and desired isotopes likewise may be introduced in solution by the use of a suitable salt in a solvent such as a soluble metal halide such as $CaCl_2$, KI, or $FeCl_2$ in a water solution preferably, or water-alcohol mixture. The water-alcohol mixture may be such as 20 percent to 100 percent water and 0 percent to 80 percent alcohol. The alcohol may be any suitable solvent such as methanol, ethanol, propanol, butanol, iso-propanol and mixtures thereof, etc.

In the separation of the calcium-44 isotope from the calcium-40 isotope by means of the complexation preference of the lighter isotope for the polyether, the metal isotope may be introduced into solution by the use of such as calcium chloride in water or calcium chloride in a water-alcohol mixture. A water solution without alcohol may be preferred since, as an example, if methanol is used, the methylated calcium ions (i.e., those which have water of hydration molecules replaced with methanol molecules) are soluble in the organic phase and may considerably dilute the isotope enrichment or depletion between the two phases. The use of water-alcohol mixture is feasible, though, and, to illustrate, the calcium chloride complex of the macrocyclic polyether 2,3,11,12-dibenzo-1,4,7,10,13,16-hexaoxacyclooctadeca-2,11-diene has been formed by reacting equimolar quantities of salt and polyether in 1-butanol and subsequently evaporating Table I

| Compound | Macrocyclic Polyether Nomenclature |
|---|---|
| I | 2,3,Benzo-1,4,7-trioxacyclonona-2-ene |
| II | 2,3-Benzo-1,4,7,10-tetraoxacyclododeca-2-ene |
| III | 2,5,8,11-Tetraoxabicyclo[10.4.0]-hexadecane |
| IV | 2,3-Benzo-1,4,7,10,13-pentaoxacyclopentadeca-2-ene |
| V | 2,3-(4'-tert-Butylbenzo)-1,4,7,10,13-pentaoxacyclopentadeca-2-ene |
| VI | 2,3-(2',3'-Naphtho)-1,4,7,10,13-pentaoxacyclopentadeca-2-ene |
| VII | 2,5,8,11,14-Pentaoxabicyclo[13.4.0]-nonadecane |
| VIII | 17-(tert-Butyl)-2,5,8,11,14-pentaoxabicyclo[13.4.0.]-nonadecane |
| IX | 2,5,8,11,14-Pentaoxatricyclo[13.8.0.0$^{17,22}$]-tricosane |
| X | 2,3-Benzo-1,4,7,10,13,16-hexaoxacyclooctadeca-2-ene |
| XI | 2,3-(4'-tert-Butylbenzo)-1,4,7,10,13,16-hexaoxacyclooctadeca-2-ene |
| XII | 2,3-(2'3'-Naphtho)-1,4,7,10,13,16-hexaoxacyclooctadeca-2-ene |
| XIII | 2,5,8,11,14,17-Hexaoxabicyclo[16.4.0.]-docosane |
| XIV | 20-(tert-Butyl)-2,5,8,11,14,17-hexaoxabicyclo[16.4.0]-docosane |

Table I-continued

| Compound | Macrocyclic Polyether Nomenclature |
|---|---|
| XV | 2,3,9,10-Dibenzo-1,4,8,11-tetraoxacyclotetradeca-2,9-diene |
| XVI | 2,3,9,10-Bis(4' or 5'-ter-butylbenzo)-1,4,8,11-tetraoxacyclotetradeca-2,9-diene |
| XVII | 2,6,13,17-Tetraoxatricyclo[16.4.0.0$^{7,12}$]-docosane |
| XVIII | 9,20 or 21-Di-(tert-butyl)-2,6,13,17-tetraoxatricyclo[16.4.0.0$^{7,12}$]-docosane |
| XIX | 2,3,12,13-Dibenzo-1,4,11,14-tetraoxacycloeicosa-2,12-diene |
| XX | 2,3,16,17-Dibenzo-1,4,15,18-tetraoxacyclooctacosa-2,16-diene |
| XXI | 2,3,9,10-Dibenzo-1,4,8,11,14-pentaoxacyclohexadeca-2,9-diene |
| XXII | 2,3,11,12-Dibenzo-1,4,7,10,13-pentaoxacyclooctadeca-2,11-diene |
| XXIII | 2,3,9,10-Dibenzo-1,4,8,11,14,17-hexaoxacyclononadeca-2,9-diene |
| XXIV | 2,3,8,9-Dibenzo-1,4,7,10-tetraoxacyclododeca-2,8-diene |
| XXV | 2,3,8,9-Dibenzo-1,4,7,10,13-pentaoxacyclopentadeca-2,8-diene |
| XXVI | 2,3,8,9-Dibenzo-1,4,7,10,13,16-hexaoxacyclooctadeca-2,6-diene |
| XXVII | 1,4,7,10,13,16-Hexaoxacyclooctadecane |
| XXVIII | 2,3,11,12-Dibenzo-1,4,7,10,13,16 hexaoxacyclooctadeca-2,11-diene |
| XXIX | 2,3,11,12-Bis(4' or 5'-tert-butylbenzo)-1,4,7,10,13,16-hexaoxacyclooctadeca-2,11-diene |
| XXX | 2,3,11,12-Di-(2',3'-naphtho)-1,4,7,10,13,16-hexaoxacyclooctadeca-2,11-diene |
| XXXI | 2,5,8,15,18,21-Hexaoxatricyclo[20.4.0.0$^{9,14}$]-hexacosane |
| XXXII | 11,24 or 25-Di-(tert-butyl)-2,5,8,15,18,21-hexaoxatricyclo[20.4.0.0$^{9,14}$]-hexacosane |
| XXXIII | 2,3,11,12-Dibenzo-1,4,7,10,13,16,19-heptaoxacycloheneicosa-2,11-diene |
| XXXIV | 2,5,8,15,18,21,24-Heptaoxatricyclo[23.4.0.0$^{9,14}$]-nonacosane |
| XXXV | 2,3,14,15-Dibenzo-1,4,7,10,13,16,19,22-octaoxacyclotetracosa-2,14-diene |
| XXXVI | 2,5,8,11,18,21,24,27-Octaoxatricyclo[26.4.00$^{12,17}$]-dotriacontane |
| XXXVII | 2,3,14,15-Di(2',3'-naphtho)-1,4,7,10,13,16,19,22-octaoxacyclotetracosa-2,14-diene |
| XXXVIII | 2,3,17,18-Dibenzo-1,4,7,10,13,16,19,22,25,28-decaoxacyclotriaconta-2,17-diene |
| XXXIX | 2,5,8,11,14,21,24,27,30,33-Decaoxatricyclo[32.4.0.0$^{15,20}$]-octatriacontane |
| XL | 2,3,20,21-Dibenzo-1,4,7,10,13,16,19,22,25,28-31,34,37,40,43,46-hexadecaoxacyclooctatetraconta-2,20-diene |
| XLI | 2,5,8,11,14,17,24,27,30,33,36,39,42,45,48,51-Hexadecatricyclo[50.4.0.0$^{18,23}$]-hexapentacontane |
| XLII | 2,3,32,33-Dibenzo-1,4,7,10,13,16,19,22,25,28 31,34,37,40,43,46,49,52,55,58-eicosaoxacyclohexaconta-2,32-diene |
| XLIII | 2,5,8,11,14,17,20,23,26,29,39,42,45,48,51,54,57,60,63-Eicosaoxatricyclo[62.4.0.0$^{30,35}$]-octahexacontane |
| XLIV | 2,3,11,12-Dibenzo-1,4,7,10,13,18-hexaoxacyclodocosa-2,11-diene |
| XLV | 2,3,15,16-Dibenzo-1,4,9,14,17,22-hexaoxacyclohexacosa-2,15-diene |
| XLVI | 2,3,8,9,14,15-Tribenzo-1,4,7,10,13,16-hexaoxacyclooctadeca-2,8,14-triene |
| XLVII | 2,3,8,9,14,15-Tribenzo-1,4,7,10,13,16-hexaoxacyclononadeca-2,8,14-triene |
| XLVIII | 2,3,8,9,14,15-Tribenzo-1,4,7,10,13,16,19-heptaoxacycloheneicosa-2,8,14-triene |
| XLIX | 2,3,8,9,14,15,20,21-Tetrabenzo-1,4,7,10,13,16,19,22-octaoxacyclotetracosa-2,8,14,20-tetraene | to dryness. In this invention however, a different method of formation is employed thereby permitting the use of high concentrations and resulting directly in a two phase equilibrium of calcium salt and complex.

The calcium chloride complex of 2,3,11,12-dibenzo-1,4,7,10,13,16-hexaoxacyclooctadeca-2,11-diene may be prepared by mixing one phase of calcium chloride six water ($CaCl_2 \cdot 6H_2O$) in methanol with a second phase of this polyether in such as chloroform ($CHCl_3$) as a solvent. The complex may also be formed by mixing a concentrated calcium chloride-water phase with the polyether dissolved in methylene chloride (CH₂Cl₂). Likewise, the calcium chloride complex of 2,5,8,15,21-hexaoxatricyclo[20.4.0.0]hexacosane may be formed in the same manner thus illustrating that a water-alcohol mixture may be unnecessary. Generally, in both of these methods the aqueous phase must be near saturation. The limits to which the concentration may be restricted will vary depending upon the element being used.

This invention deals with a novel method of metal isotope separation by liquid-liquid extraction, made possible by the formation of metal salt complexes with macrocyclic polyethers. This chemical exchange system involves the isotopic equilibrium between solvated metal ions and the metal complex which is formed with the cyclic polyether according to a reaction such as:

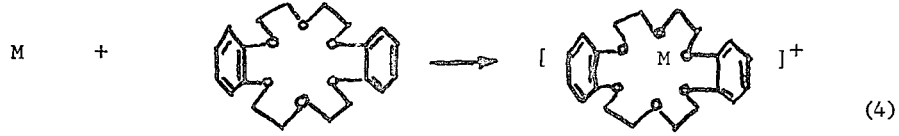

(4)

| Solvated Metal Ion | Polyether: 2,3,11,12-dibenzo-1,4,7,10,13,16-hexaoxacyclooctadeca-2,11-diene | Metal Complex of the Polyether |

It has been found that in the formation of a metal complex with an ion of an element having more than one stable isotope, an isotopic effect occurs in that one isotope of the metal used is preferentially attracted to the "hole" in the cyclic polyether. Examples of cations which may be separated by this invention include such as sodium (²²Na)(radioactive), potassium (⁴¹K), rubidium (⁸⁷Rb), cesium (¹³⁷Cs)(radioactive), magnesium (²⁶Mg), calcium (⁴³,⁴⁴,⁴⁶,⁴⁸Ca), strontium (⁸⁴Sr,⁹⁰Sr)(radioactive), barium (¹³⁰,¹³²Ba), lanthanum (¹³⁸La), cerium (¹³⁶,¹³⁸Ce), silver (¹⁰⁷Ag), zinc (⁶⁸,⁷⁰Zn), cadmium (¹⁰⁶,¹¹⁶Cd), mercury (¹⁹⁶,¹⁹⁸Hg), titanium (⁴⁷Ti), lead (²⁰⁴Pb) and iron (⁵⁷Fe). This listing is not intended to be all inclusive since similar results may be obtained with isotopes of other elements.

In using the apparatus as shown in the drawing and described hereinabove for effecting this invention, the organic phase containing the cyclic polyether has a greater affinity for the lighter isotope and therefore results in an enrichment of the concentration in the aqueous phase of the heavier isotope. The polyether can be present in an organic solvent as described hereinabove, or, as in the case of 2,5,8,15,21-hexaoxatricyclo-[20.4.0.0]hexacosane which has a low melting point, in the pure form. The ⁴⁴Ca-⁴⁰Ca system is typical of reactions involving this invention since (1) calcium or the metal isotope is soluble in an aqueous phase, (2) the complex is soluble in an organic phase (3) a closed loop reflux system exists and (4) calcium chloride is quantitatively extracted from the organic phase by mixing with pure water at room or elevated temperature.

In extracting the lighter isotope of calcium from the heavier isotope, a three-stage separation may be performed. In each separation the calcium distribution ratio may be 95 percent calcium in the aqueous phase and 5 percent calcium in the organic phase with approximate phase volumes of 20 percent aqueous and 80 percent organic phases of the total volume of each separation. Ratios of 95-5 are arbitrary, however, and could, for all practical purposes, be 50—50 or any other ratio that was convenient. Collection of several samples at each stage of the separation and conversion into calcium nitrate·four water (Ca(NO₃)₂·4H₂O) for analysis revealed that a single stage separation factor alpha (α) of at least 1.004 may be achieved.

Table II illustrates the different phase compositions for three exchange systems.

TABLE II

SUMMARY OF PHASE COMPOSITIONS FOR THREE EXCHANGE SYSTEMS

|  | I | II | III |
|---|---|---|---|
| Top Phase | CaCl₂.6H₂O In Methanol | CaCl₂ in Water | A* in CH₂Cl₂ |
| Bottom Phase | A* in CHCl₃ | B** in CHCl₃ | CaCl₂ in Water |
| Total Calcium Concentration moles/liter |  |  |  |
| a) aqueous phase | 2.1 | 5.2 | 5.2 |
| b) organic | 0.034 | 0.041 | 0.019 |
| Polyether concentration organic phase moles/liter | 0.042 | 0.068 | 0.039 |
| Complex Concentration in organic phase, moles/liter | 0.024 | 0.041 | 0.017 |

A* = 2,3,11,12-dibenzo-1,4,7,10,13,16-hexaoxacyclooctadeca-2,11-diene
B** = 2,5,8,15,18,21-hexaoxatricyclo[20.4.0.0]hexacosane As previously stated, different solvents, polyethers and metal ions may form suitable two-phase chemical exchange systems. These have been listed hereinabove. The polyether 2,5,8,15,18,21-hexaoxatricyclo[20.4.0.0]hexacosane is one of the strongest polyether complexing agents known for metals. This consists of a mixture of cis-trans isomers and has a melting range of about 36° to 56°C. The use of calcium picrate as a color indicator in a two-phase system of this polyether in chloroform and calcium chloride in water indicates that the complex forms readily over a wide range of calcium chloride concentrations. The lighter calcium isotope complexed in the organic phase may be extracted by contacting that phase with water or the like at a temperature greater than about 45°C.

It may be desired to use elevated temperatures such as between about 25°C and about 60°C to effect extraction of the metal isotope from the organic cyclic polyether — for example, to effect extraction of all calcium isotopes from the organic phase of the 2,5,8,15,18,21-hexaoxatricyclo-[20.4.0.0]hexacosane complex. In one example, a chloroform solution 0.044 molar in the above complex was mixed with water and allowed to come to equilibrium at several temperatures. Aliquots of the aqueous phase were taken and analyzed for calcium isotope concentration at intervals shown in Table III. The results shown in Table III indicate the effect of temperature on extraction of calcium isotope from the organic phase of the 2,5,8,15,18,21-hexaoxatricyclo-[20.4.0.0]hexacosane complex.

TABLE III

Ca$^{++}$ DISTRIBUTION AS A FUNCTION OF TEMPERATURE

| Temp. °C. | Aqueous Ca$^{++}$Conc. Moles per liter | Organic Phase Ca$^{++}$Conc. Moles per liter | Distribution Ratio |
|---|---|---|---|
| 26 | 0.166 | 0.0017 | 98 |
| 31 | 0.160 | 0.0012 | 133 |
| 40 | 0.155 | 0.0003 | 520 |
| 44 | 0.148 | < 0.0001 | — |

The system 2,5,8,15,18,21-hexaoxatricyclo[20.4.0.0]hexacosane in chloroform and calcium chloride in water has been found to be better than others with a separation factor $\alpha$ equal to 1.006 for the calcium-44/40 ratio. The simple process separation factor $\alpha$ is given by the ratio between the isotopic composition ratios in the two phases, in this case $\alpha = (^{44}Ca/^{40}Ca)(aqueous)/(44Ca/40Ca)(organic) = 1.006$. This polyether also used in the calcium isotope effect determination was a mixture of two structural isomers, a trans-anti-trans (d,1) and trans-syn-trans (meso) forms. Since the calcium complexes of each isomer have different stability constants, different isotopic effects for the isomers are expected. The observed $\alpha$ of 1.0015 per mass unit is probably an average of the two effects.

The solubility of a complex is related to the polarity of the solvent; however, highly polar solvents (e.g., dimethylsulfoxide) are completely miscible with water. Methylene chloride with dipole moment of 1.54 debye units has been found to be better in some respects than chloroform which has a dipole moment of 1.02 debye units. The system 2,3,11,12-dibenzo-1,4,7,10,13,16-hexaoxacyclooctadeca-2,11-diene in methylene chloride and calcium chloride in water is suitable provided aqueous calcium concentrations are maintained at approximately 5.2 moles/liter or greater. This is system III in Table II.

The chemical exchange system may be used to separate various other metal isotopes from those listed in the group hereinabove. An iron complex, for example, was formed with 2,3,11,12-dibenzo-1,4,7,10,13,16-hexaoxacyclooctadeca-2,11-diene in chloroform with an aqueous phase of ferrous chloride in water. Potassium also forms a complex with the same polyether in chloroform with an aqueous phase of potassium iodide in water. Melting point analysis of the above complexes confirmed their existence. Isotopes of any of the metals listed hereinabove may be separated using the chemical exchange system as shown in the drawing and described herein provided suitable solvents are chosen and provided a suitable macrocyclic polyether is chosen from those listed in Table I as well as other similar macrocyclic polyethers. This invention may be used to separate one of the isotopes or conversely, remove one of the isotopes in the feed solution which may not be desired. Depending upon whether the heavier or the lighter isotope are desired, one would retain the appropriate solution.

What is claimed is:

1. A method for obtaining metal values enriched in one of the isotopes of said metal, said metal being selected from the group consisting of sodium, potassium, rubidium, cesium, magnesium, calcium, strontium, barium, lanthanum, cerium, silver, zinc, cadmium, mercury, titanium, lead and iron, comprising contacting a first aqueous phase containing a water-soluble halide of said metal with an organic phase comprising a macrocyclic polyether selected from the compounds set forth in Table I thereby forming a macrocyclic polyether complex of said metal, said complex being enriched in the lighter isotope of said metal, separating said macrocyclic polyether complex from the resulting metal depleted aqueous phase, contacting said separated complex with a second aqueous phase thereby transferring said complexed metal from said macrocyclic polyether to said second aqueous phase, and separating the resulting macrocyclic polyether from the light isotope enriched second aqueous phase.

2. The method of claim 1 together with heating said macrocyclic polyether complex to from about 25°C to about 60°C during the transfer of said lighter of said isotopes from said macrocyclic polyether.

3. The method of claim 1 wherein said aqueous phase contains calcium chloride at a concentration of at least 5.2 moles per liter, said isotopes are calcium-44 and calcium-40, said macrocyclic polyether is 2,3,11,12-dibenzo-1,4,7,10,13,16-hexaoxacyclooctadeca-2,11-diene, said macrocyclic polyether further contains chloroform, and said calcium-40 complexes and separates with said 2,3,11,12-dibenzo-1,4,7,10,13,16-hexaoxacyclooctadeca-2,11-diene.

4. The method of claim 1 wherein said aqueous phase contains calcium chloride at a concentration of at least 5.2 moles per liter, said isotopes are calcium 44 and calcium-40, said macrocyclic polyether is 2,5,8,15,18,21-hexaoxatricyclo[20.4.0.0]hexacosane, said macrocyclic polyether further contains chloroform, and said calcium-40 isotope complexes and separates with said 2,5,8,15,18,21-hexaoxatricyclo[20.4.0.0]hexacosane.

5. The method of claim 1 including using a solvent for the macrocyclic polyether taken from the group consisting of trichloromethane and methylene chloride.

6. The method of claim 1 wherein said soluble metal halide is calcium chloride.

* * * * *